United States Patent [19]

Wagenseil

[11] Patent Number: 5,101,630
[45] Date of Patent: Apr. 7, 1992

[54] BRAKING VALVE ARRANGEMENT FOR A HYDROSTATIC DRIVE

[75] Inventor: Ludwig Wagenseil, Vohringen, Fed. Rep. of Germany

[73] Assignee: Hydromatik GmbH, Elchingen, Fed. Rep. of Germany

[21] Appl. No.: 639,818

[22] Filed: Jan. 9, 1991

[30] Foreign Application Priority Data

Jan. 12, 1990 [DE] Fed. Rep. of Germany ....... 4000801

[51] Int. Cl.$^5$ .............................................. F16D 31/02
[52] U.S. Cl. ...................................... 60/460; 60/464; 60/466; 91/433; 180/244
[58] Field of Search ................. 60/460, 459, 464, 466, 60/493, 467, 468, 494, 474; 91/433, 468, 421, 420, 461; 180/6.3, 242, 244, 305

[56] References Cited

U.S. PATENT DOCUMENTS

| | | | |
|---|---|---|---|
| 3,125,324 | 3/1964 | Vivier | 91/420 |
| 3,672,167 | 6/1972 | Griesenbrock | 60/466 |
| 3,996,840 | 12/1976 | Futamata et al. | 91/461 |
| 4,083,381 | 4/1978 | McClocklin et al. | 91/461 |
| 4,145,957 | 3/1979 | McClocklin | 91/461 |
| 4,407,122 | 10/1983 | Nanda | 91/461 |
| 4,611,527 | 9/1986 | Breeden | 91/461 |

FOREIGN PATENT DOCUMENTS 1961930 10/1969 Fed. Rep. of Germany .
2232857 1/1974 Fed. Rep. of Germany ........ 91/461

Primary Examiner—Edward K. Look
Assistant Examiner—Hoang Nguyen
Attorney, Agent, or Firm—Scully, Scott, Murphy & Presser

[57] ABSTRACT

The invention relates to a braking valve arrangement for a hydrostatic drive operated in open circuit, in particular for vehicle drives, wherein a hydraulic pressure medium is supplied to the hydraulic motor from the hydraulic pump via a reversing directional control valve as desired through one of two branches each containing a pressure limiting valve and a braking control valve, and the pressure medium is discharged to the tank through the respective other of the two branches. The braking control valve controls the flow of hydraulic medium through the respective branch depending on the pressure in the respective other branch and has parallel with it a non-return valve opening into the hydraulic motor. To reduce the outlay in the valve and lines a valve unit is provided in each branch of which the valve body is formed as a closure body of the non-return valve, urged in the closing direction by a spring, as a control piston of the braking control valve and as the housing for the closure element of the pressure limiting valve, wherein the valve body is urged controllably towards the closure position depending on the pressure in the respective other branch, and thus acts as a control piston in cooperation with a valve seat to effect controlled throttling of the flow of pressure medium from the control chamber to the tank.

10 Claims, 2 Drawing Sheets

BRAKING VALVE ARRANGEMENT FOR A HYDROSTATIC DRIVE

TECHNICAL FIELD OF THE INVENTION

The invention relates to a braking valve arrangement of the kind mentioned in the preamble of claim 1.

BACKGROUND OF THE INVENTION AND PRIOR ART

Braking valve arrangements in hydrostatic drives operated in open circuit are intended to prevent the occurrence of incomplete filling of the hydraulic motor with pressure medium, which is preferably hydraulic oil. This is necessary, for example, if the rotational speed taken off from the hydraulic motor (or the stroke speed of an equivalent piston-cylinder unit for moving an end-use device) exceeds the respective rotational or linear speed (stroke speed) corresponding to the flow of pressure medium delivered by the hydraulic pump. Such an incomplete filling or increase in speed of this kind, which results in the hydraulic motor operating as a hydraulic pump, can, for example, occur in the thrust operation of a vehicle driven by the hydraulic motor, in particular when moving downhill with a braking load applied to the hydraulic motor or when reversing the direction of rotation of the hydraulic motor by means of the reversing directional control valve. The incomplete filling of the hydraulic motor with pressure medium referred to leads to undesirable cavitation. Furthermore a hydraulic motor without a braking valve arrangement of the kind mentioned, which must not be confused with a hydraulic operating brake of an end-use device, is not capable of slowing down this end-use device, for example the driven vehicle, gently.

BACKGROUND OF THE INVENTION AND PRIOR ART

A braking valve arrangement of the kind mentioned in the preamble of claim 1 is disclosed, for example, in DE-AS 11 61 154. The hydraulic pump of the hydrostatic drive described therein, in particular for motor vehicles, conveys a hydraulic pressure medium from the tank via the reversing directional control valve as desired via one of two branches, each containing a pressure limiting valve, to a hydraulic motor and from here back via the other branch and the directional control valve to the tank. In each of the two branches a braking control valve arranged between the directional control valve and the respective pressure limiting valve controls the passage of the pressure medium through the respective branch depending on the pressure in the other branch and is bridged by a line containing a non-return valve. According to an embodiment described therein the maximum pressures to which the pressure limiting valves arranged in the branches react can be adjusted.

A disadvantage of this known braking valve arrangement is the outlay on valves and the rather extensive outlay on connecting lines, which results in extensive circuitry.

OBJECT OF THE INVENTION

It is an object of the invention to provide a braking valve arrangement of the kind mentioned in the introduction that reduces the outlay on valves and hydraulic lines.

SUMMARY OF THE INVENTION

To this end, in a braking valve arrangement of the kind mentioned in the preamble of claim 1, a valve unit is provided in each branch in which the non-return valve, the braking control valve and the pressure limiting valve are combined by forming the body of the valve unit as a closure member of the non-return valve that is urged by a spring towards the closed position, as the control piston of the braking control valve and as a housing for the closure member of the pressure limiting valve, and with a control surface that cooperates with a control edge or a valve seat and can be acted on by the pressure medium in the opening direction and bounds a control chamber, wherein in the open position the valve body can be controllably urged towards the closed position depending on the pressure in the respective other branch and thus, in cooperation with the control edge or the valve seat as the case may be, acts as a control piston to effect controlled throttling of the amount of pressure medium flowing from the control chamber to the tank.

The valve units according to the invention are structurally compact with not many hydraulic lines; they combine together the three essential functions of the standard braking valve arrangements, namely the non-return valve function in each branch for the pressure medium supplied to the hydraulic motor, the braking function by the controlled discharge of pressure medium to the tank when the hydraulic motor operates as a pump, and the pressure limiting function for secondary assurance and determination of the maximum braking force applied to the hydraulic motor when it operates as a pump. The non-return valve and the braking control valve are one and the same valve which, according to the operating condition, can perform both functions, namely the check function and the braking control function.

A hydrostatic drive, in particular for vehicle drives, is known from DE-OS 19 61 930, in which the non-return valves and so-called relief valves associated with the two branches are combined in pairs in a valve unit (FIG. 2) and operate as a braking valve arrangement (FIG. 6) wherein the non-return valves operate as braking control valves for which the intended value of the braking force is predetermined by relief valves. However, in this known braking valve arrangement there is neither the combination of non-return valve, braking control valve and pressure limiting valve as integral components of the valve body of the valve unit nor the functional connection of the control of the valve body in accordance with the pressure in the respective other branch.

To control the action of the pressure medium on the valve body towards the closed position, in each of the two valve units it is advantageous to connect the control chamber and a counter-control chamber facing in the other direction by a respective connecting line provided with a throttle. Preferably a pilot valve arrangement is provided which controls the discharge of pressure medium from the counter-control chambers of the two valve units depending on the pressure in the branch containing the respective other valve unit. An advantageous design of the pilot valve arrangement is one in which in both valve units the discharge of pressure medium from the counter-control chambers is completely free above an upper limiting pressure in the respective other branch, and in the region between the upper and a lower limiting pressure is throttle controlled and on reaching the lower limiting pressure it is completely closed. By this means, i.e. when the end-use device is driven by the hydraulic motor, the discharge of pressure medium from the valve unit located downstream in the branch of the hydraulic motor, which in normal operation is completely free, is throttled or completely shut off on changing over to the braking operation, which is characterised by the pressure in the respective other branch falling below the upper limiting pressure. It is advantageous if the pilot valve arrangement is formed as a continuously adjustable, spring-centred 3/3 way valve common to both branches. A pilot valve arrangement in the form of two continuously adjustable 2/2 way valves, one associated with each of the valve units, is also advantageous.

The control chamber of each valve unit and the associated control surface are preferably divided functionally by a respective valve seat cooperating with the said control surface into a non-return valve control chamber with a non-return valve control surface and a braking control valve with a braking control valve control surface.

According to another aspect of the invention the pressure limiting valve in the valve body of each valve unit comprises a closure element acted on by a closure spring the discharge chamber of which is connected to the control chamber of the respective other valve unit. In this way, when there is excessive braking load on the hydraulic motor, further pressure medium in excess of the through-flow capacity of the throttle between the control surface of the braking control valve and the valve seat can be supplied to the hydraulic motor.

To obtain a particularly compact design and reduce the number of hydraulic lines the two valve units and the pilot valve arrangement are preferably formed in a common valve block.

BRIEF DESCRIPTION OF THE DRAWINGS

The invention will now be described in more detail with reference to two exemplary embodiments of the braking valve arrangement according to the invention shown in the drawings, in which.

DETAILED DESCRIPTION OF PREFERRED EMBODIMENTS OF THE INVENTION

Figure 1:
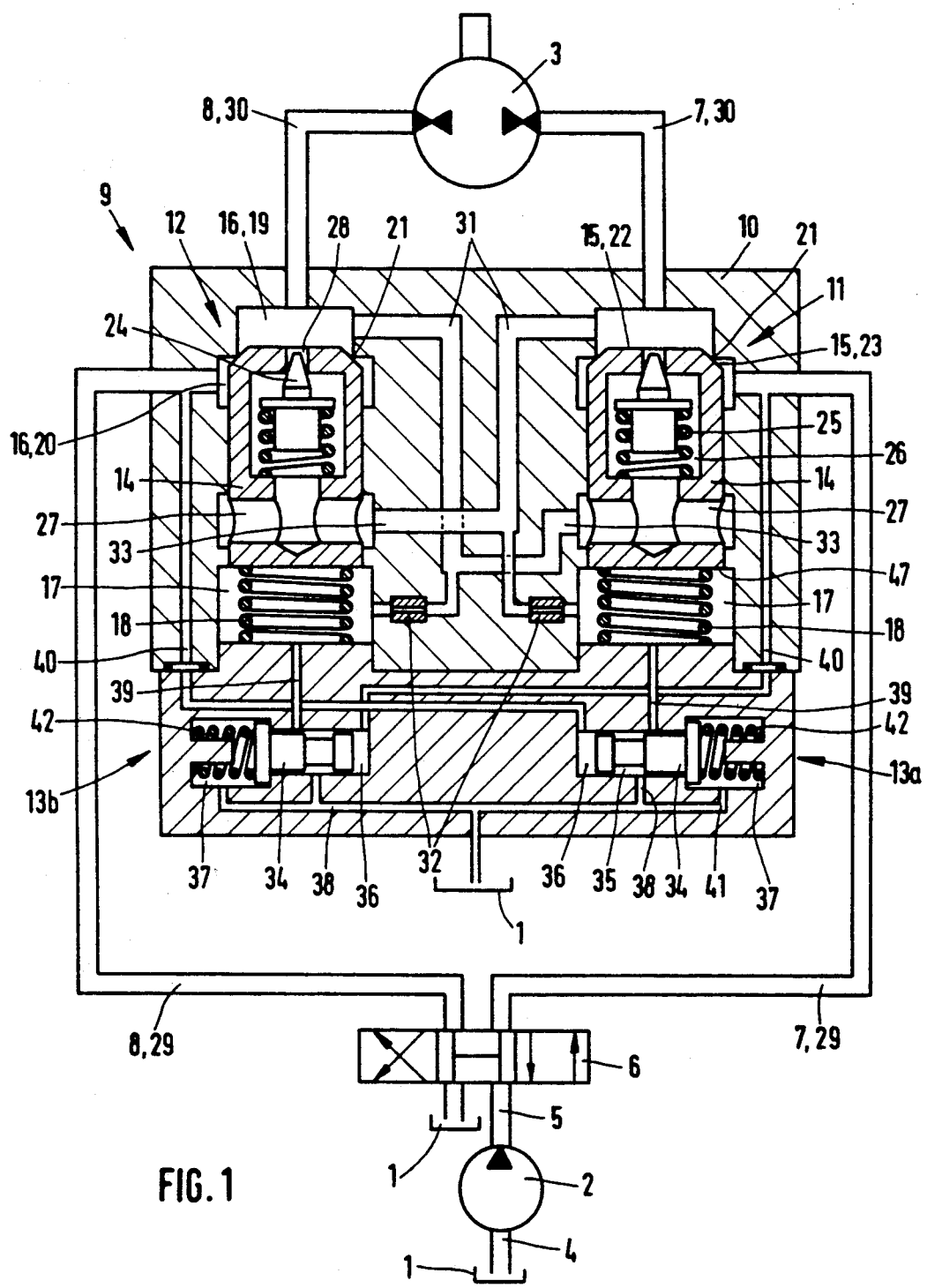
FIG. 1 shows the first exemplary embodiment of the braking valve arrangement according to the invention as part of a hydrostatic drive.

The open circuit hydrostatic drive shown in the drawing includes a tank 1 for the hydrostatic pressure medium, a hydraulic pump 2 which can be driven by a drive (not shown) and a reversible hydraulic motor 3. The hydraulic pump 2 is connected via a line 4 to the tank 1 and via a line 5 to a 4/3 reversing directional control valve 6 that is connected by branch lines 7 and 8 to the inlet or to the outlet of the hydraulic motor 3.

The braking valve arrangement 9 according to the invention is formed in a valve block 10 divided into two parts and includes two valve units 11, 12 and a pilot valve arrangement 13.

Each valve unit 11, 12 includes a valve body 14 in the form of a cylindrical piston which is arranged so that it can be displaced in a bore made in the valve block 10. Within this bore, an end or control surface 15 of the piston bounds a control chamber 16 and the opposite end surface 47 of the piston bounds a spring chamber 17 having a spring 18 arranged therein. The end of the valve body associated with the control chamber 16 is shaped as a truncated cone with a flat and a bevelled end surface section. A valve seat 21 dividing the control chamber 16 functionally into a first control chamber region 19 and a second control chamber region 20 cooperates with the bevelled end surface section and likewise divides it functionally into two bevelled surface sections. The flat end surface section and the adjoining bevelled surface section together form a first control surface part 22 associated with the first control chamber region 19 while the other bevelled surface section forms a second control surface part 23 associated with the second control chamber region 20.

A pressure limiting valve with a closure element 24 acted on by a closure spring 25 is integrated in each valve unit 11, 12. For this purpose each valve body 14 is formed as a housing with a receiving chamber 26 for the closure element 24 and the closure spring 25 and with a discharge chamber 27 connected thereto. One conically shaped end of the closure element 24 closes an axial through-bore 28 in the valve body 14 connecting the receiving chamber 26 with the control chamber 16. The surfaces in the receiving chamber 26 and in the discharge chamber 27 acted on by the pressure medium are balanced so that pressure medium flowing in does not cause the valve body 14 to move.

Both branch lines 7, 8 include a respective first branch line section 29 and a respective second branch line section 30. The first branch line sections 29 connect the reversing directional control valve 6 to the second control chamber region 20 of the valve units 11 and 12, while the second branch line sections 30 connect the first control chamber regions 19 to the hydraulic motor 3.

The control chamber region 19 and the spring chamber 17 of each valve unit 11, 12 are connected to one another by a respective connecting line 31 with a throttle 32. The discharge chamber 27 of each valve unit 11, 12 is connected to the connecting line 31 of the other respective valve unit 11 or 12 by a respective connection line 33.

The pilot valve arrangement 13 shown in FIG. 1 comprises two continuously adjustable pilot valves 13a and 13b, each in the form of a 2/2 way valve with a control piston 34 which has an annular channel 35 and a control oil chamber 36 and bounds an opposite compression spring chamber 37. Each of the two pilot valves 13a and 13b is connected by its own respective emptying connection 38 to the tank and by its own respective relief connection 39 to the spring chamber 17 of the valve unit 11 of the right-hand branch line 7 or the valve unit 12 of the left-hand branch line 8. Furthermore each of the two pilot valves 13a and 13b has its control oil chamber 36 connected by its own respective control channel 40 to the first branch line section 29 of the respective other branch line 8 or 7 and its compression spring chamber 37 connected to a compression spring chamber 37 by its own respective oil leakage outlet 41 to its own emptying connection 38. The control pistons 34 of the two pilot valves 13a and 13b are held by respective compression springs 42 in the respective compression spring chambers 37 in the closed position in which the respective relief connection 39 is closed. The emptying connections 38 are open in all positions of the control piston 34.

Figure 2:
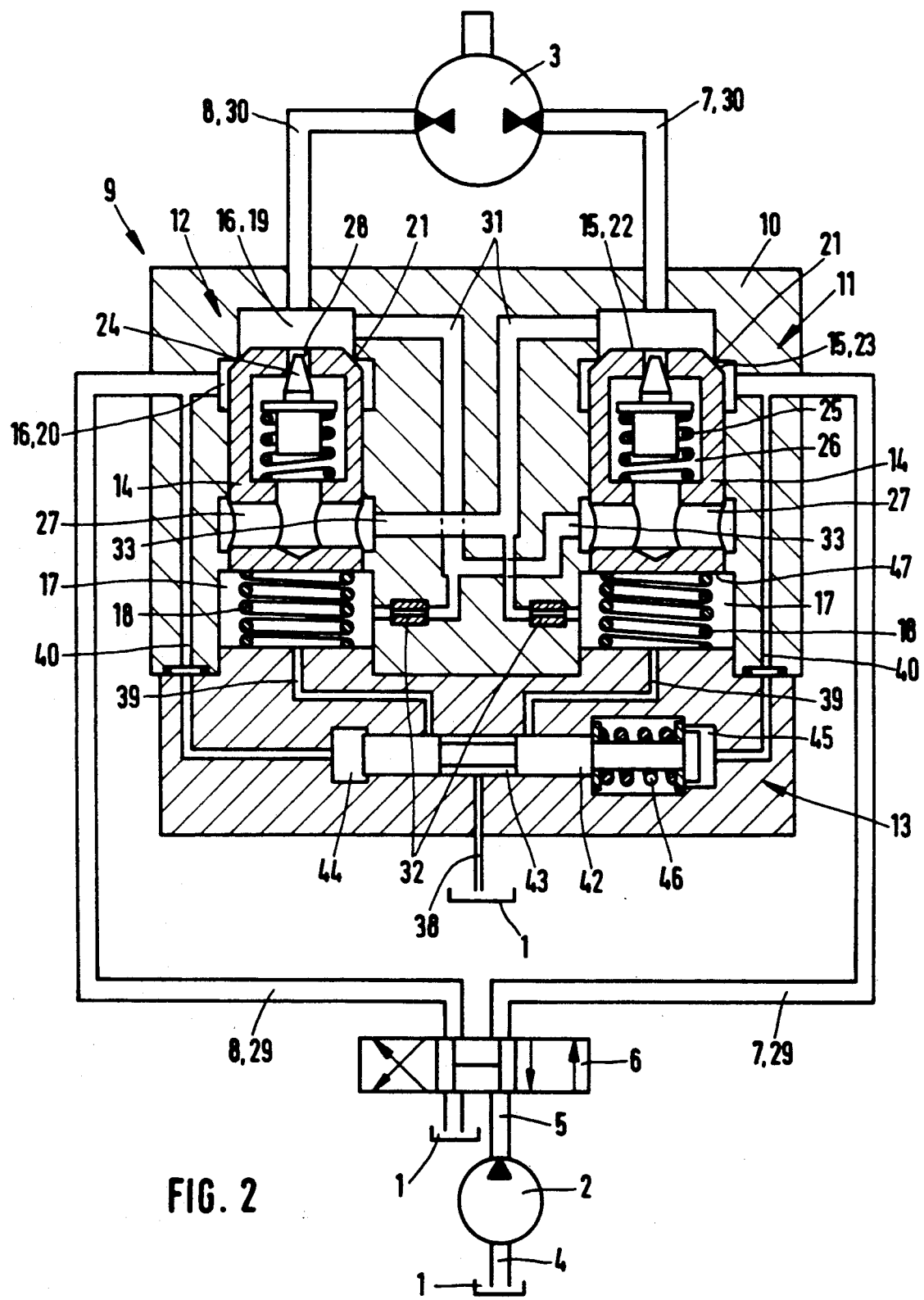
FIG. 2 shows the second exemplary embodiment of the braking valve arrangement according to the invention as part of a hydrostatic drive.

In the embodiment shown in FIG. 2 the pilot valve arrangement 13 is a single pilot valve unit 13 common to both branch lines 7, 8 in the form of a continuously adjustable, spring-centred 3/3 way valve. This valve is provided with a control piston 42 which has a symmetrically arranged annular channel 43 and bounds two opposed control oil chambers 44, 45. Each of the two control oil chambers is connected by its own control channel 40 to the first branch line section 29 of the right-hand or left-hand branch line 7, 8 as the case may be. In the right-hand control oil chamber 45 there is a centering spring 46 which urges the control piston 42 towards the closed position. In the closed position the control piston 42 closes two relief connections 39 leading to the spring chambers 17 of the two valve units 11, 12. An emptying connection 38 leads to the tank 1 and is open in all positions of the control piston 42.

The operation of the braking valve arrangement is as follows: At the start of travel, with the valve units 11, 12 closed, the reversing directional control valve 6 is switched from the closed position shown in both drawings into the right-hand switching position corresponding to the forward gear. The pressure medium pressurised by the hydraulic pump 2 acts on the second control surface part 23 in the second control chamber region 20 of the right-hand valve unit 11. As soon as the hydraulic pressure force exceeds the force of the spring 18 in the spring chamber 17 of this valve unit 11, the valve body 14 thereof is moved into the open position and as a result the valve unit 11, which at this moment is acting as a non-return valve, is opened. The second control chamber region 20 and the second control surface part 23 of the valve unit 11 then act as non-return valve control chamber and non-return valve control surface respectively.

The hydraulic pressure in the control chamber 15 of the opened valve unit 11 is then transmitted via the second branch line section 30 to the hydraulic motor 3, and in addition via the connecting line 31 into the opposite spring chamber 17 and via the connection line 33 into the discharge chamber 27 and the receiving chamber 26 of the valve body 14 of the left-hand valve unit 12 said pressure having no effect on the valve body 14 of left-hand valve unit 12 since the pressure exerted on the valve body 14 is coextensive with the spring 18 of the left-hand valve unit 12 which itself biases the valve body 14 into the closed position. At the same time, when the pressure in the right-hand branch line 7 reaches an upper limit, the control piston 34 of the left-hand pilot valve 13b or the control piston 42 of the pilot valve unit 13 is displaced to the left against the pressure of the compression spring 37 or the centering spring 46 as the case may be, until the relief connection 39 of the left-hand valve unit 12 is completely open so that its spring chamber 17 is connected to the tank 1. The relief connection 39 of the right-hand pilot valve 13a or the pilot valve unit 13, leading to the spring chamber 17 of the right-hand valve unit 11, remains closed.

The pressure medium supplied from the hydraulic pump 2 causes the hydraulic motor 3 and thus the end-use device connected thereto, to rotate. The pressure medium flowing from the hydraulic motor 3 acts via the second branch line section 30 of the left-hand branch line 8 on the first control surface part 22 in the first control chamber region 19 of the left-hand valve unit 12 and opens it as soon as the hydraulic pressure exceeds the pressure of the spring 18 in the spring chamber 17.

The pressure medium now flows, at a rate depending on their cross-sections, through the connecting line 31, the spring chamber 17 and the left-hand pilot valve 13b or the pilot valve unit 13 and via the second control chamber region 20, the first branch line section 29 of the left-hand branch line 8 and the reversing directional control valve 6 back to the tank 1 almost without pressure. As a result of the pressure in the flowing pressure medium the right-hand pilot valve 13a remains in the closed position and the pilot valve unit 13 in said left-hand switching position. Should overloading occur in the right-hand branch line 7 the pressure medium can be discharged to the tank 1 via the opening closure element 24 of the non-return valve 14, 24, 25 of the right-hand valve unit 11, the discharge chamber 27, the connection line 33, the connecting line 31, the control chamber 16, the left-hand branch line 8 and the directional control valve 6. Any pressure medium reaching the spring chamber 17 of the left-hand valve unit 12 via the throttle 32 is emptied into the tank via the relief connection 39.

When the vehicle travels downhill the hydraulic motor 3 begins, under the thrust effect of the end-use device, to rotate at a speed greater than that corresponding to the flow of pressure medium from the hydraulic pump 2. The hydraulic motor then acts as a hydrostatic pump, so that the pressure in the right-hand branch line 7 is lowered. When this pressure falls below the upper pressure limit the compression spring 37 or the centering spring 46 causes the control piston 34 of the left-hand pilot valve 13b or the control piston 42 of the pilot valve unit 13 to move to the right into an intermediate position region. As the braking load of the hydraulic motor 3 further increases and the pressure falls below a specific lower pressure limit the control piston 34 or 42 is moved further to the right into the above-mentioned closing position.

Changing from the left-hand switching position into the intermediate position region reduces the complete flow-off surface on the control edge of the left-hand pilot valve 13b or of the pilot valve unit 13 so that the flow of pressure medium from the spring chamber 17 of the left-hand valve unit 12 is throttled depending on the position of the control piston. The valve body 14 of the left-hand valve unit 12 is urged towards the closed position by the increase in the hydraulic pressure and the mechanical pressure of the spring 18 resulting from and corresponding to this throttling, and depending on the fall in pressure at the throttle 32 in the spring chamber 17 of the left-hand valve unit 12, until it reaches the position in which the force acting thereon is in equilibrium with the respective hydraulic force of the pressure medium flowing into the first control chamber region 19. In this (throttle) position the cross-section of the flow passage is reduced between the valve seat 21 and the first control surface part 22 or its inclined surface section so that the flow of pressure medium out of the control chamber 16 is throttled (reduced) and in this way the hydraulic motor 3 is slowed down. Under these conditions the left-hand valve unit 12 operates as a braking control valve since it is acting to reduce the flow of pressure medium thus necessarily slowing down hydraulic motor 3 the valve body 14 thus operates as a control piston of which the first control surface part 22, acting as braking control valve control surface, cooperates with the valve seat 21 to make it possible to arrest the vehicle gently until it comes to a standstill. The first control chamber region 19 is thus to be characterised as a braking control valve control chamber. As above discussed, the control piston 34 or 42 when moved into its intermediate position by the compression spring 37 or the centering spring 46 in response to a lowering of the pressure in the right-hand branch line 7 occasioned by the excessive rotation speed of hydraulic motor 3, reduces the flow of pressurized fluid out of spring chamber 17 of the left-hand valve unit 12, thus building up a hydraulic back pressure in the region between the control piston 34 or 42 and the throttle element 32. This hydraulic back pressure acts on the end surface 47 of the spring chamber 17 and thus exerts a hydraulic force urging the valve body 14 into the closed position. Spring 18 also urges the valve body 14 into its closed position. When these pressures reach equilibrium with the pressure of pressurized medium acting on control surface 15 of the valve body 14 which results from pressure medium in control chamber 16, valve body 14 discontinues moving toward the closed position and maintains a partially open attitude thereby producing a restricted passage for the flow of pressure medium. Consequently, pressure builds in control chamber 16 and second branch line section 30 and the hydraulic motor 3 slows down thus acting as a brake to slow the vehicle. All of the actions, herein described are proportionate to the amount of braking.

As the load on the hydraulic motor 3, and thus the pressure exerted on the braking control valve control surface 22, changes, the control piston 14 assumes a corresponding new throttle position with correspondingly changed throttling of the stream of pressure medium flowing to the tank 1. As soon as the pressure in the braking control valve control chamber 19 exceeds the pressure of the closure spring 25 in the receiving chamber 26 of the left-hand valve unit 12, in particular when the left-hand pilot valve 13b or the pilot valve unit 13 is in the closed position, the pressure limiting valve (closure member 24) opens and frees the throughbore 28. The stream of pressure medium is now guided back to the hydraulic motor 3 via the receiving chamber 26, the discharge chamber 27, the connection line 33, the connecting line 31 and the first control chamber region 19 of the right-hand valve unit 11, and in this way prevents the occurrence of cavitation.

The braking valve arrangement according to the invention also operates in the manner described above if the hydraulic motor 3 is subjected to a braking load by switching the reversing directional control valve 6 into the middle or into the left-hand switching position corresponding to the reversing gear.

What is claimed is:

1. A braking valve arrangement for a hydrostatic drive operated in open circuit, for vehicle drives, wherein a hydraulic pressure medium is supplied to the hydraulic motor from the hydraulic pump via a reversing directional control valve as desired through one of two branches each containing a pressure limiting valve, and the pressure medium is discharged to the tank through the respective other of the two branches, and a respective braking control valve is arranged in each branch which controls the passage of pressure medium through the respective branch depending on the pressure in the respective other branch and which has in parallel with it a non-return valve opening into the hydraulic motor, wherein a valve unit is arranged in each of said branches in which the non-return valve, the braking control valve and the pressure limiting valve are combined by forming the valve body of said valve unit as a closure member of the non-return valve which is urged towards the closed position by a spring, as the control piston of the braking control valve and as the housing for the closure element of the pressure limiting valve, wherein said valve body has a control surface that can be urged towards the open position by the pressure medium, cooperates with a control edge or a valve seat and bounds a control chamber, and wherein said valve body, when in the open position, can be controllably urged towards the closed position depending on the pressure in the respective other branch and thus, in cooperation with the control edge or the valve seat, acts as a control piston to effect controlled throttling of the flow of pressure medium from the control chamber to the tank.

2. A braking valve arrangement according to claim 1, wherein the control chamber and an oppositely-facing counter-control chamber of each of the two valve units are connected by a respective connecting line provided with a throttle for the purpose of controlled action of pressure medium on the respective valve body towards the closed position.

3. A braking valve arrangement according to claim 2, wherein the counter-control chamber is a spring chamber containing a spring.

4. A braking valve arrangement according to claim 2, which includes a pilot valve arrangement for controlling the flow of pressure medium from the counter-control chambers of said two valve units depending on the pressure in the branch containing the respective other valve unit.

5. A braking valve arrangement according to claim 4, wherein, by means of the pilot valve arrangement, the flow of pressure medium from the counter-control chambers of said two valve units into the respective other branch is completely freed when the pressure exceeds an upper limiting value, and in the region between the upper and a lower limiting pressure value it is controlled by throttling, and on reaching the lower limiting pressure it is completely shut off.

6. A braking valve arrangement according to claim 4, wherein the pilot valve arrangement includes as pilot valves two continuously adjustable 2/2 way valves each of which is connected by a respective relief connection to the counter-control chamber of one of the two valve units and with a respective emptying connection to the tank and has a control oil chamber opposite a compression spring chamber which is connected by a control passage to the branch containing the respective other valve unit.

7. A braking valve arrangement according to claim 4, wherein the pilot valve arrangement is a pilot valve arrangement common to both branches in the form of a continuously adjustable spring-centred 3/3 way valve that is connected by respective relief connections to the counter-control chambers of both valve units and by an emptying connection to the tank, and has two control oil chambers opposite one another which are each connected by a respective control passage to one of the branches.

8. A braking valve arrangement according to claim 1, wherein the control chamber of each valve unit and the associated control surface are divided functionally by a respective valve seat cooperating with said control surface into a non-return valve control chamber with a non-return valve control surface and a braking control valve control chamber with a braking control valve control surface.

9. A braking valve arrangement according to claim 1, wherein the pressure limiting valve in the valve body of each valve unit comprises a closure member that is acted on by a closure spring and has a discharge chamber that is connected to the control chamber of the respective other valve unit.

10. A braking valve arrangement according to claim 1, wherein both valve units and the pilot valve arrangement are formed in a common valve block.

* * * * *